United States Patent
Choi et al.

(10) Patent No.: US 11,271,744 B2
(45) Date of Patent: Mar. 8, 2022

(54) SIMPLE AUTHENTICATION METHOD AND SYSTEM USING BROWSER WEB STORAGE

(71) Applicant: SWEMPIRE CO., LTD., Goyang-si (KR)

(72) Inventors: Myoung Soo Choi, Goyang-si (KR); Seung Ryul Pee, Gwangmyeong-si (KR)

(73) Assignee: SWEMPIRE CO., LTD., Goyang-si (KR)

(*) Notice: Subject to any disclaimer, the term of this patent is extended or adjusted under 35 U.S.C. 154(b) by 0 days.

(21) Appl. No.: 17/369,342

(22) Filed: Jul. 7, 2021

(65) Prior Publication Data

US 2021/0336791 A1    Oct. 28, 2021

Related U.S. Application Data

(63) Continuation of application No. PCT/KR2020/012396, filed on Sep. 14, 2020.

(30) Foreign Application Priority Data

| Oct. 11, 2019 | (KR) | 10-2019-0125975 |
| Oct. 11, 2019 | (KR) | 10-2019-0125976 |
| Oct. 11, 2019 | (KR) | 10-2019-0125977 |

(51) Int. Cl.
*H04L 9/32* (2006.01)
*H04L 9/06* (2006.01)
(Continued)

(52) U.S. Cl.
CPC ......... *H04L 9/3228* (2013.01); *H04L 9/0643* (2013.01); *H04L 9/0863* (2013.01);
(Continued)

(58) Field of Classification Search
CPC ..... H04L 9/3228; H04L 9/302; H04L 9/0643; H04L 9/0894; H04L 9/0863; H04L 2209/38
See application file for complete search history.

(56) References Cited

U.S. PATENT DOCUMENTS

| 9,148,424 B1 * | 9/2015 | Yang ................. H04L 63/20 |
| 11,157,899 B1 * | 10/2021 | Nelson ............... H04L 67/104 |

(Continued)

FOREIGN PATENT DOCUMENTS

| CN | 101944216 A | 1/2011 |
| CN | 108027926 A | 5/2018 |

(Continued)

OTHER PUBLICATIONS

Menezes, Alfred J. et al., Handbook of Applied Cryptography, CRC Press, Jun. 1996.

(Continued)

*Primary Examiner* — Taghi T Arani
*Assistant Examiner* — Blake I Narramore
(74) *Attorney, Agent, or Firm* — Studebaker & Brackett PC

(57) ABSTRACT

A simple authentication method using browser web storage according to an embodiment of the present disclosure includes the operations in which: on the basis of a received user key, a server generates an authentication token, a public key and a private key, stores the same in a session, and transmits the authentication token, the public key and a session key corresponding to the session to a terminal; by using the received public key, the terminal encrypts PIN number data entered by a user, and transmits the encrypted data along with the received session key to the server; and by using the private key corresponding to the received session key, the server decrypts the PIN number data to
(Continued)

perform simple authentication, wherein the user key and the PIN number data may be stored in the terminal web storage and set differently for each device or browser.

12 Claims, 11 Drawing Sheets

(51) Int. Cl.
*H04L 9/08* (2006.01)
*H04L 9/30* (2006.01)
(52) U.S. Cl.
CPC ............ *H04L 9/0894* (2013.01); *H04L 9/302* (2013.01); *H04L 2209/38* (2013.01)

(56) References Cited

U.S. PATENT DOCUMENTS

| | | | | |
|---|---|---|---|---|
| 2002/0023059 | A1* | 2/2002 | Bari | H04L 63/083 705/76 |
| 2007/0283011 | A1* | 12/2007 | Rakowski | H04L 67/125 709/225 |
| 2008/0028206 | A1* | 1/2008 | Sicard | H04L 9/3263 713/156 |
| 2009/0204808 | A1* | 8/2009 | Guo | G06F 21/41 713/155 |
| 2012/0072714 | A1* | 3/2012 | Grandcolas | H04L 9/3226 713/155 |
| 2013/0305392 | A1* | 11/2013 | Bar-El | H04L 9/08 726/29 |
| 2016/0351080 | A1* | 12/2016 | Bhatnagar | H04L 9/3228 |
| 2017/0046689 | A1* | 2/2017 | Lohe | G06Q 20/40 |
| 2017/0221052 | A1* | 8/2017 | Sheng | G06Q 20/3829 |
| 2017/0228731 | A1* | 8/2017 | Sheng | G06Q 20/401 |
| 2018/0294977 | A1* | 10/2018 | Uhr | H04L 9/32 |
| 2019/0230092 | A1* | 7/2019 | Patel | H04L 9/0869 |
| 2020/0004983 | A1* | 1/2020 | Chen | H04L 63/0428 |
| 2021/0264052 | A1* | 8/2021 | Magerkurth | H04L 9/14 |

FOREIGN PATENT DOCUMENTS

| | | |
|---|---|---|
| CN | 110226177 A | 9/2019 |
| KR | 10-2010-0109008 A | 10/2010 |
| KR | 10-2012-0037314 A | 4/2012 |
| KR | 10-2015-0005789 A | 1/2015 |
| KR | 10-1666374 B1 | 10/2016 |
| KR | 10-1802826 B1 | 11/2017 |
| KR | 10-1879758 B1 | 8/2018 |
| KR | 10-2019-0069759 A | 6/2019 |
| KR | 10-2101719 B1 | 5/2020 |
| KR | 10-2101726 B1 | 5/2020 |
| KR | 10-2117871 B1 | 6/2020 |

OTHER PUBLICATIONS

International Search Report issued in PCT/KR2020/012396; dated Dec. 8, 2020.
An Office Action mailed by National Intellectual Property Administration, PRC dated Oct. 18, 2021, which corresponds to Chinese Patent Application No. 202080007983.5 and is related to U.S. Appl. No. 17/369,342; with English language translation.

* cited by examiner

SIMPLE AUTHENTICATION METHOD AND SYSTEM USING BROWSER WEB STORAGE

CROSS-REFERENCE TO RELATED APPLICATION

The present application is a continuation of International Patent Application No. PCT/KR2020/012396, filed on Sep. 14, 2020, which is based upon and claims the benefit of priority to Korean Patent Application Nos. 10-2019-0125975 filed on Oct. 11, 2019, 10-2019-0125976 filed on Oct. 11, 2019 and 10-2019-0125977 filed on Oct. 11, 2019. The disclosures of the above-listed applications are hereby incorporated by reference herein in their entirety.

BACKGROUND

1. Technical Field

The present disclosure relates to a simple authentication method and system using browser web storage, and more particularly, to a method and system for issuing one-time public and private keys for each device and browser using simple authentication data stored in the web storage and performing simple authentication using the issued public and private keys.

2. Description of Related Art

Due to the development of Internet services, most people use the Internet to access government institutions, educational institutions, medical institutions, telecommunication companies, financial companies, passenger transport companies, asset management, credit information, portal sites, social network services (SNS), and numerous online services such as games, shopping, ticketing, courier services, and electronic voting.

Accordingly, a user who wants to use such a service needs to either sign up for a membership by entering personal information including his or her real name, or authenticate that he or she is a registered user by entering a specific ID and password. However, since it is quite cumbersome to repeat this authentication procedure for respective sites, recently, a method for easily performing financial transactions on the Internet by helping users log in more easily, called simple authentication, has been developed.

In the past, a method mainly used for authenticating these users was a method using a symmetric key. However, this symmetric key method has a drawback in that it is not safe from hackers because a single secret key is used in both a server and a terminal.

In order to solve this drawback, a method of encrypting data and performing authentication using a combination of a public key and a private key has been developed.

However, in using a public key and a private key for existing user authentication, the browser storage (local storage) still uses a plaintext storage method, so there are many security concerns. Although the encryption method is taken as a security measure, these methods still have drawbacks of personal information leakage or security. Accordingly, in order to solve this drawback, it is necessary to safely store and use a public key and a private key.

SUMMARY

An aspect of the present disclosure is directed to providing a simple authentication method and system using browser web storage. The simple authentication is performed by issuing a one-time public key for each device and browser using the simple authentication data stored in the web storage, and using the issued public key, thereby enhancing the protection and security of personal information.

In addition, secondary authentication may be performed by storing the generated private key in the session of a server and transmitting the session key and the public key for the stored session to a terminal.

In addition, it is possible to prevent falsification of the public key by storing the public key stored in the server in a blockchain, and to secure the non-repudiation and integrity of the authentication by storing the authentication log data in the blockchain.

The aspects of the present disclosure are not limited to those mentioned above, and other aspects not mentioned herein will be clearly understood by those skilled in the art from the following description.

A simple authentication method using browser web storage according to an embodiment of the present disclosure may include the operations in which: a server generates a one-time session and a session key corresponding to the one-time session according to an authentication request, generates an authentication token, a public key and a private key based on a user key received from a terminal and stores the same in the one-time session, and transmits the session key, the authentication token and the public key to the terminal; using the received public key, the terminal encrypts PIN number data entered by a user, and transmits the encrypted data along with the received session key to the server; using the private key stored in the one-time session corresponding to the received session key, the server decrypts the received encrypted PIN number data, and identifies whether the decrypted PIN number data matches the PIN number data previously stored in the browser web storage to perform primary authentication; when the primary authentication result matches, the terminal encrypts the received authentication token using the received public key and transmits same along with the received session key to the server; using the private key stored in the one-time session corresponding to the received session key, the server identifies whether the received encrypted authentication token matches the authentication token stored in the one-time session to perform secondary authentication; and when the second authentication is completed, the server deletes the one-time session and the session key, wherein the user key and the PIN number data are stored in the browser web storage and set differently for each device or browser, and wherein the authentication token, the public key, the private key, the one-time session, and the session key are one-time generated whenever an authentication is requested.

In addition, wherein the user key is encrypted with an encryption algorithm, and the PIN number is hash-encrypted and stored in the browser web storage.

In addition, the transmission of the public key to the terminal comprises: determining, by the terminal, whether the user key is stored in the browser web storage; and when the user key is not stored, registering a PIN number from a user.

In addition, when the primary authentication result does not match, the server updates a number of authentication attempts, and when the number of authentication attempts is greater than or equal to a predetermined value, the server deletes the PIN number data previously stored in the server.

In addition, the browser web storage comprises a web storage of a blockchain-based browser, and the public key is stored in the blockchain and used to verify whether the public key has been falsified or forged.

In addition, the simple authentication method using browser web storage according to an embodiment of the present disclosure may further include extracting, by the server, a modulus, a private exponent and a public exponent from the generated public key and private key; storing the private exponent in the terminal and storing the modulus and the public exponent in a blockchain; and performing simple authentication by the terminal using the private key generated by receiving the private exponent stored in the terminal and the modulus stored in the blockchain and the server using the public key generated by receiving the modulus and the public exponent stored in the blockchain at the time of simple authentication, wherein the private key and public key generated during the performance of the simple authentication are one-time keys generated when a simple authentication request is received, and are discarded after being used once for encryption or decryption, respectively.

In addition, the performance of the simple authentication further comprises: transmitting the modulus to the terminal in response to a simple authentication request in the blockchain; generating, by the terminal, the private key using the modulus and the stored private exponent; encrypting, by the terminal, data and performing digital signature using the generated private key; transmitting, by the terminal, the encrypted data and digital signature to the server; and discarding, by the terminal, the private key.

In addition, the performance of the simple authentication further comprises: transmitting the modulus and the public exponent to the server in response to a simple authentication request in the blockchain; generating, by the server, the public key using the modulus and the public exponent; decrypting, by the server, the encrypted data received from the terminal using the generated public key, and performing verification using the digital signature; and discarding, by the server, the public key.

In addition, the public exponent is converted into hexadecimal and compiled.

In addition, the public key is generated in an RSA method in connection with user identification data.

A simple authentication system using browser web storage according to another embodiment of the present disclosure may include: a server that: generates a one-time session and a session key corresponding to the one-time session according to an authentication request, generates an authentication token, a public key and a private key based on a user key received from a terminal and stores same in the one-time session, transmits the session key, the authentication token and the public key to the terminal, decrypts the encrypted PIN number data using the private key stored in the one-time session corresponding to the received session key upon receipt of the encrypted PIN number data and the session key from the terminal, identifies whether the decrypted PIN number data matches the PIN number data previously stored in the browser web storage to perform primary authentication, identifies whether the received encrypted authentication token matches the authentication token stored in the one-time session to perform secondary authentication using the private key stored in the one-time session corresponding to the received session key upon receipt of the encrypted authentication token and the session key from the terminal, and deletes the one-time session and the session key when the secondary authentication is completed; and a terminal that: requests the server to issue a public key on the basis of the user key, encrypts PIN number data entered by the user using the public key received from the server, and transmits the encrypted data along with the received session key to the server, and when the primary authentication result matches, encrypts the received authentication token using the received public key and transmits same along with the received session key to the server, wherein the user key and the PIN number data are stored in the browser web storage and set differently for each device or browser, and wherein the authentication token, the public key, the private key, the one-time session, and the session key are one-time generated whenever an authentication is requested.

A computer program combined with a computer and stored in a computer-readable recording medium to execute a simple authentication method using browser web storage.

Other specific details of the present disclosure are included in the detailed description and drawings.

According to an embodiment of the present disclosure, authentication can be performed by issuing a different private key for each device or browser using simple authentication data stored in the web storage. In addition, by supporting the generation of a one-time key based on the public key for each authentication request, stronger security can be provided in a simple authentication method. Accordingly, it is possible to provide a reliable and simple authentication method that can replace authentication certificates.

The advantages of the present disclosure are not limited to the above-mentioned advantages, and other advantages, which are not specifically mentioned herein, will be clearly understood by those skilled in the art from the following description.

DETAILED DESCRIPTION

Figure 1:
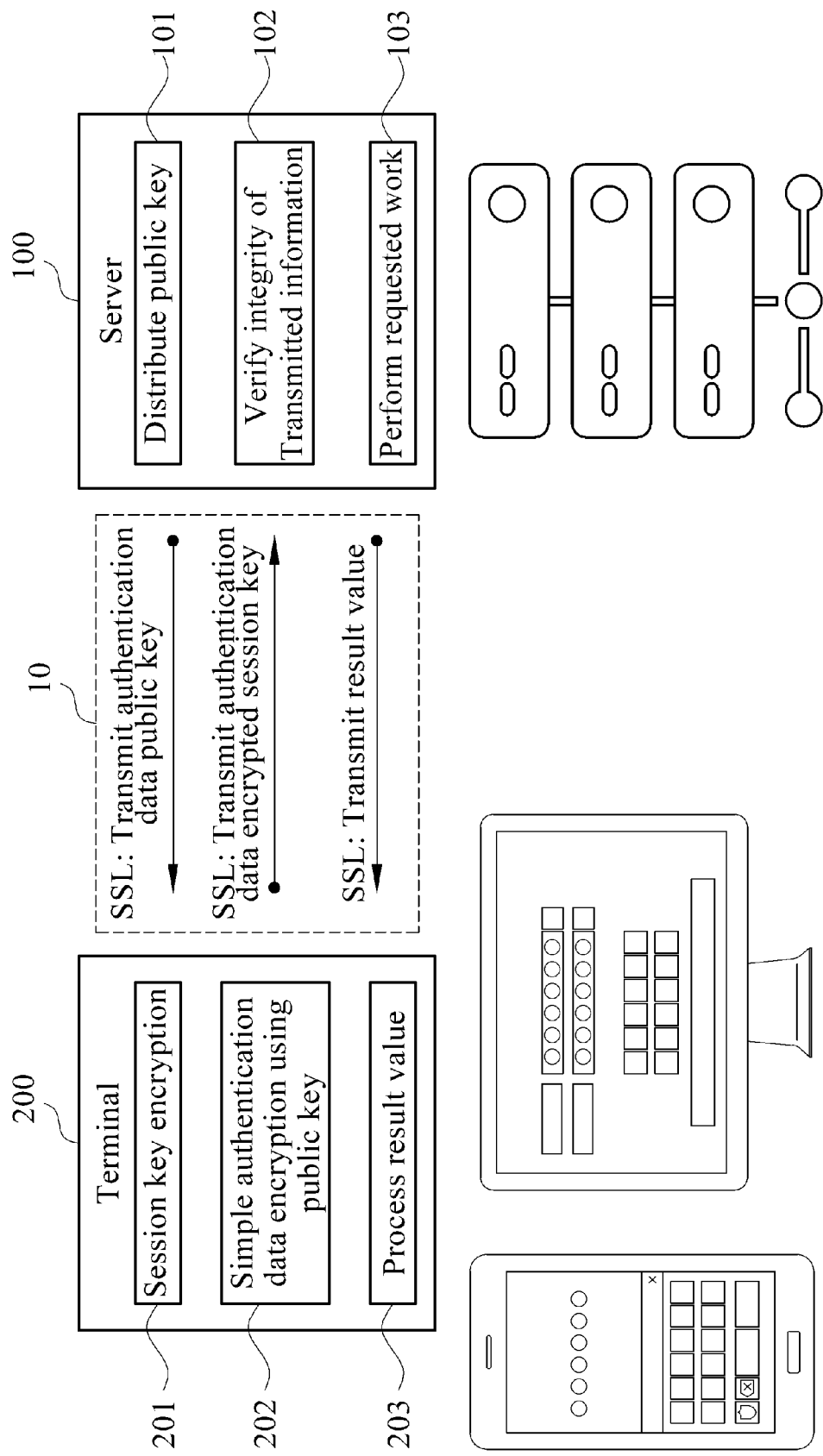
FIG. 1 is a conceptual diagram for explaining a simple authentication system using browser web storage according to an embodiment of the present disclosure.

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will be thorough and complete and will fully convey the scope of the present disclosure to those skilled in the technical field to which the present disclosure pertains, and the present disclosure will only be defined by the appended claims.

Terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein indicate existence of one or more other elements other than stated elements but do not exclude presence of additional elements. Like reference denotations refer to like elements throughout the specification. As used herein, the term "and/or" includes each and all combinations of one or more of the mentioned components. It will be understood that, although the terms "first", "second", etc., may be used herein to describe various components, these components should not be limited by these terms. These terms are only used to distinguish one component from another component. Accordingly, a first component mentioned below could be termed a second component without departing from the technical ideas of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Spatially relative terms, such as "below," "beneath," "lower," "above," "upper," and the like, may be used for ease of description to describe a relationship between one component and another components as illustrated in the drawings. Spatially relative terms may be intended to encompass different orientations of the components in use or operation in addition to the orientation illustrated in the drawings. For example, if the component illustrated in the drawings is turned over, components described as "below" or "beneath" other components would then be oriented "above" the other components. Accordingly, the example term "below" can encompass both an orientation of above and below. The component may also be oriented in a different orientation, and accordingly, the spatially relative terms may be interpreted according to the orientation.

Hereinafter, embodiments of the present disclosure will be described in detail with reference to the accompanying drawings.

FIG. 1 is a conceptual diagram for explaining a simple authentication system using browser web storage according to an embodiment of the present disclosure.

Referring to FIG. 1, a simple authentication system using browser web storage according to an embodiment of the present disclosure may include a server 100 and a terminal 200.

First, the server 100 and the terminal 200 may perform end-to-end encryption for all communication intervals 10 through an SSL encryption method. The server 100 generates a public key and a private key and store the same in a session. While distributing the public key in operation 101, the server may transmit a session key for the session corresponding to the public key to the terminal 200.

The terminal 200 may perform encryption on the session key received in operation 201, and encrypt simple authentication data using the public key received in operation 202. The simple authentication data may include a user key and PIN number data. In operation 101, the server 100 verifies the integrity of the received authentication information, and when receiving the encrypted data and the session key from the terminal 200 in operation 102, the PIN number data is decrypted using the private key corresponding to the session key, and then simple authentication may be performed. An authentication token may be used separately to verify the integrity of the transmitted information, and security may be further enhanced by performing simple authentication in two operations using the authentication token.

Finally, in operation 203, the terminal 200 may perform an operation such as log-in based on a simple authentication result.

In a simple authentication method according to another embodiment, information for simple authentication may be stored in a blockchain and verified in an authentication operation.

For example, public key information for simple authentication may be stored in a blockchain. Simple authentication information is encrypted and decrypted based on a public key and a private key, but the public key for encrypting the PIN number entered by a user may be falsified or forged. Accordingly, in order to prevent such a case, the public key is stored in a blockchain method to ensure reliability, and the PIN number may be encrypted by obtaining the public key from the terminal 200 without the server 100.

As another example, authentication data (a user key and a PIN number) encrypted based on the public key may be stored in a blockchain. Accordingly, the server 100 or the terminal may perform authentication and verification of the PIN number entered by the user based on the blockchain, thereby reducing the possibility of falsification and increasing reliability.

As described above, the simple authentication system using browser web storage according to an embodiment of the present disclosure issues a one-time public key for each device and each browser using the simple authentication data stored in the web storage, and uses the issued public key to perform simple authentication, thereby enhancing the protection and security of personal information.

In addition, by storing the generated private key in the session of the server 100 and transmitting the session key and the public key for the stored session to the terminal 200, secondary authentication is performed to further enhance security.

Moreover, it is possible to prevent falsification of the public key by storing the public key stored in the server in a blockchain, and to secure the non-repudiation and integrity of the authentication by storing the authentication log data in the blockchain.

Figure 2:
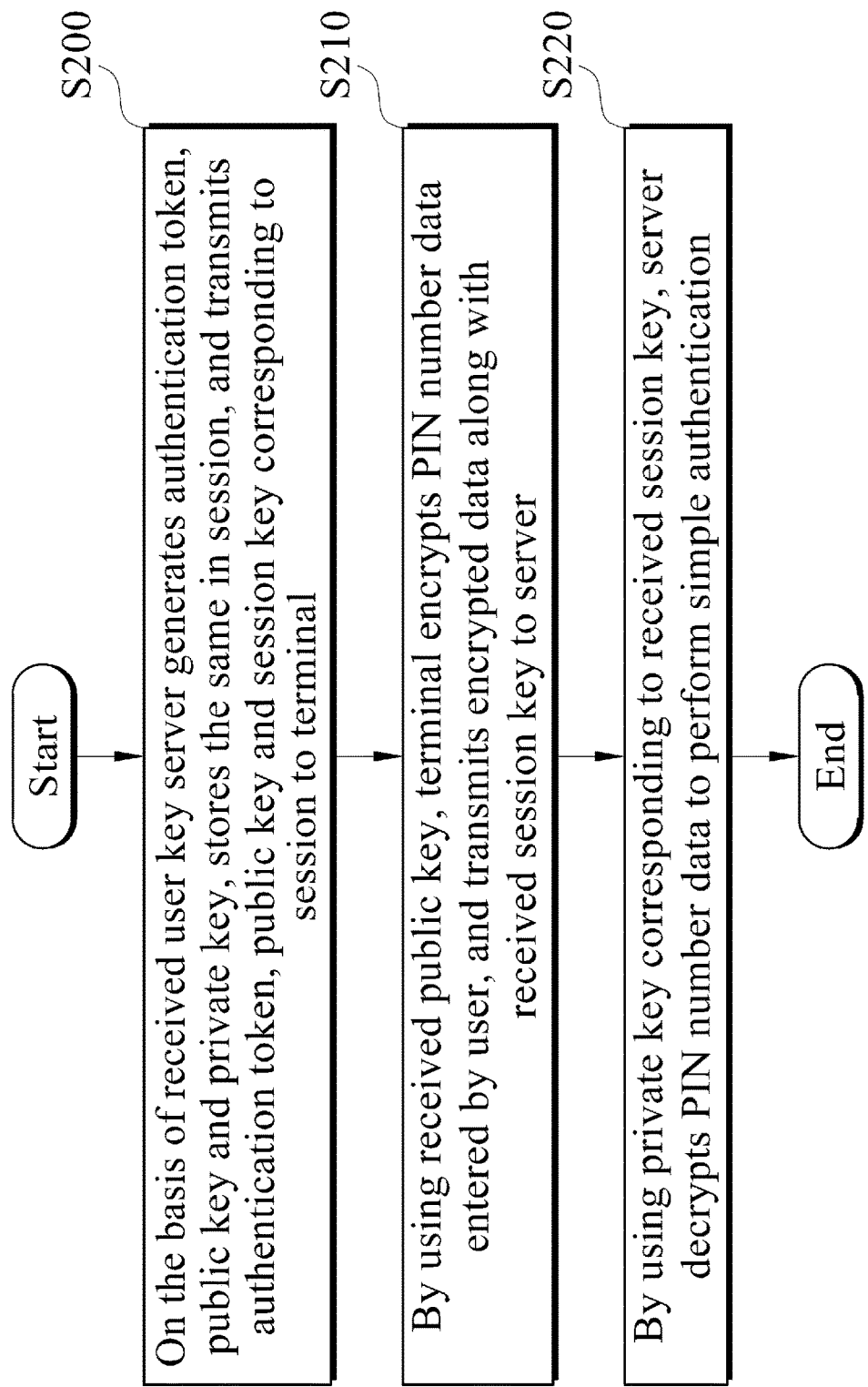
FIG. 2 is a flowchart illustrating a simple authentication method using browser web storage according to an embodiment of the present disclosure.

FIG. 2 is a flowchart illustrating a simple authentication method using browser web storage according to an embodiment of the present disclosure.

Referring to FIG. 2, in the simple authentication method using browser web storage according to an embodiment of the present disclosure, in operation S200, on the basis of a received user key, the server 100 generates an authentication token, a public key and a private key and stores the same in a session, and transmits the authentication token, the public key and a session key corresponding to the session to the terminal 200. Here, the user key may be stored in terminal web storage 200 and set differently for each device or browser.

Next, in operation S210, in the simple authentication method using browser web storage according to an embodiment of the present disclosure, by using the received public key, the terminal 200 encrypts PIN number data entered by a user, and transmits the encrypted data along with the received session key to the server 100.

Next, in operation S220, in the simple authentication method using browser web storage according to an embodiment of the present disclosure, by using the private key corresponding to the received session key, the server 100 decrypts the PIN number data to perform simple authentication.

More specifically, the server 100 restores the encrypted PIN number data based on the private key retrieved through the received session key to perform the primary authentication. Here, in the primary authentication, when the server stores PIN number data corresponding to the user key, authentication is performed at the server, and when the terminal has the PIN number data, authentication is performed at the terminal. It goes without saying that cross-validation may be performed between the server and the terminal. When the primary authentication is passed, the terminal 200 encrypts the authentication token using the public key, and transmits the encrypted data along with the received session key to the server 100. When the PIN number does not match and does not pass the primary authentication, the server 100 counts the number of authentication attempts per user key. When the accumulated count is greater than a predetermined value, the PIN number data stored in the server 100 and/or the terminal 200 is deleted in consideration of a possibility of hacking.

The server 100 performs secondary authentication by comparing the authentication token restored based on the private key with the authentication token stored in the session, and then deletes the session. In other words, the session and session key are generated once for each authentication request, and are deleted when authentication is completed, thereby preventing leakage of the generated key.

Hereinafter, an example of registering a user's PIN number and examples of performing simple authentication in the simple authentication method according to an embodiment of the present disclosure will be described in detail with reference to FIGS. 3 to 5.

Figure 3:
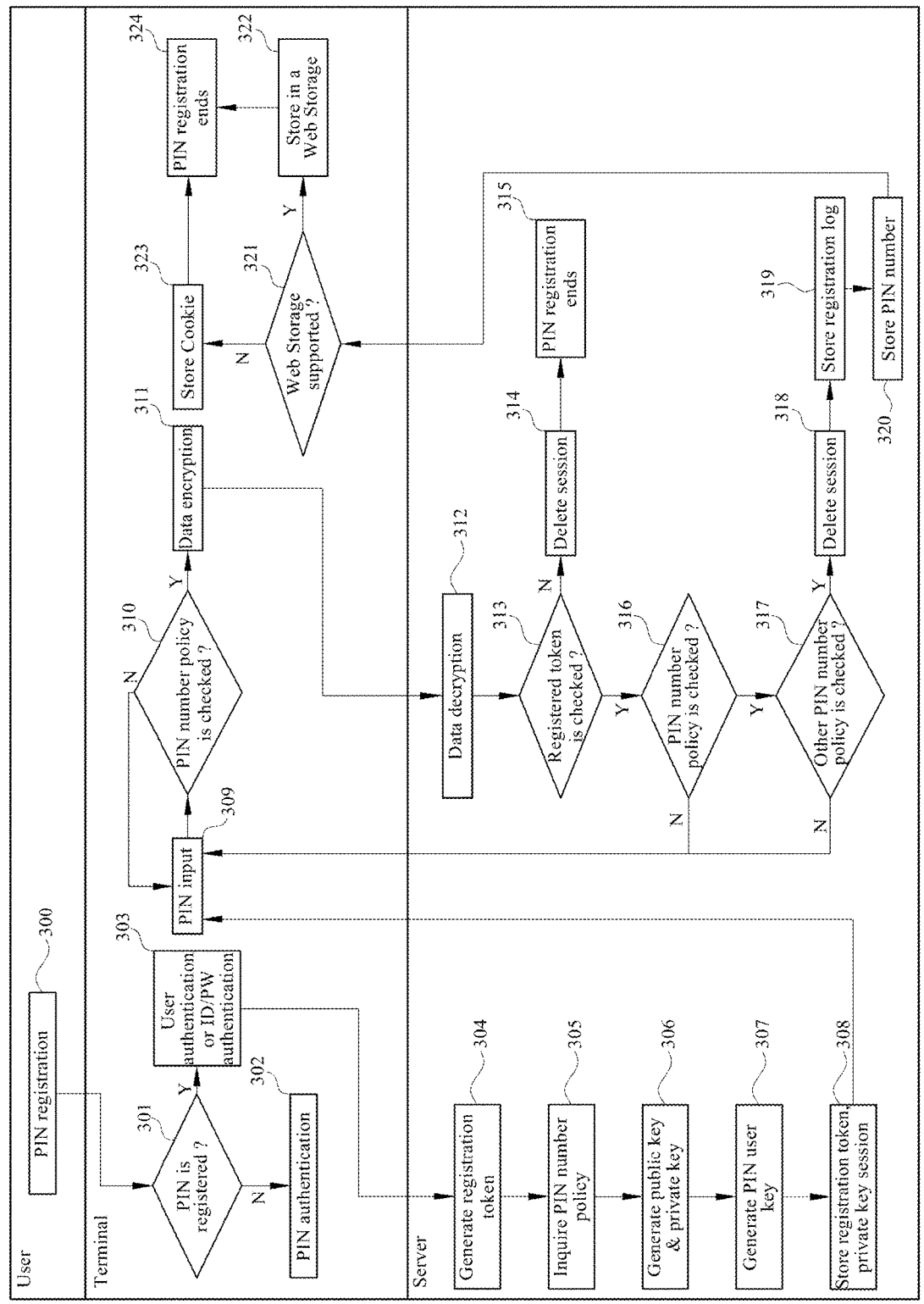
FIG. 3 is a diagram for explaining an example of registering a PIN number according to an embodiment of the present disclosure.

FIG. 3 is a diagram for explaining an example of registering a PIN number according to an embodiment of the present disclosure.

Referring to FIG. 3, when a user requests PIN registration in operation 300, the terminal 200 determines whether a PIN is registered in operation 301. When the PIN is registered, the PIN authentication operation is performed immediately. The PIN authentication operation will be described later in detail with reference to FIGS. 4 and 5.

If it is determined in operation 301 that the PIN is not registered, the terminal 200 proceeds to operation 303 to perform user authentication or ID/PW authentication. Then, the user information obtained based on the authentication result is transmitted to the server 100. Here, the user information may be information linked to the CI or user ID or inquired through a legacy system.

In operation 304, the server generates a registration token based on user information for PIN registration. Here, the registration token may be hash-encrypted data in a form in which a host name and a timestamp are combined with browser information of a user.

In addition, in operation 305, the PIN number policy is inquired. In operation 306, a public key and a private key are generated using user information. Then, in operation 307, a PIN user key is generated based on the user information. For example, the PIN user key may be data in which browser information and service domain information are added to the user information. Accordingly, the user key may be generated in the terminal 200 and transmitted to the server 100.

In operation 308, the server stores the generated registration token and private key in the session, and transmits the PIN number policy, public key, session key, and PIN user key to the terminal.

In operation 309, the terminal 200 receives a PIN number from a user. In operation 310, the terminal 200 checks whether a PIN number according to the received PIN number policy is input. For example, when the same number or consecutive numbers do not meet the criteria, it is determined as an error and operation 309 is repeated.

In operation 311, the PIN number data conforming to the PIN number policy is encrypted based on the public key. In addition, the terminal 200 transmits the PIN user key, PIN number, registration token, and session key encrypted based on the public key back to the server. SSL communication may be used between the terminal 200 and the server 100 to enhance security.

In operation 312, the server 100 may decrypt the received data using the private key corresponding to the received session key.

In operation 313, the server 100 checks the registration token. For example, it is checked whether the registration token is reused based on browser and hostname registration information, or it is checked whether the validity time has elapsed using a timestamp. When reuse is confirmed, the process proceeds to operation 314 to delete the session and complete the PIN registration procedure in operation 315.

The server 100 checks the PIN number policy once more in operation 316 and then checks other policies related to the PIN number in operation 317. For example, it is possible to inquire whether the date of birth and mobile phone number are included through the registration information of a legacy system.

When the PIN number-related other policy check is passed, the session is deleted in operation 318, and the process proceeds to operations 319 and 320 to store the PIN number and the registration token for the PIN user key.

Next, the PIN user key, PIN number, and authentication policy are transmitted to the terminal 200. In operation 321, depending on whether the web storage is supported, they are stored in the web storage 322 or in the cookie 323. When the storage is completed, in operation 324, the PIN registration procedure ends. The PIN user key may be encrypted with an encryption algorithm, and the PIN number may be hash-encrypted.

After the PIN number registration is completed as described above, authentication may be performed with the registered PIN number according to an embodiment to be described later with reference to FIG. 4 or FIG. 5. FIG. 4 illustrates a method in which the server 100 performs primary authentication and the terminal 200 performs verification. FIG. 5 explains a method in which the terminal 200 performs primary authentication and the server 100 performs verification. It will be apparent to those skilled in the technical field to which the present disclosure pertains that some simple authentication procedures may be implemented using a blockchain in the operation to be described later.

Figure 4:
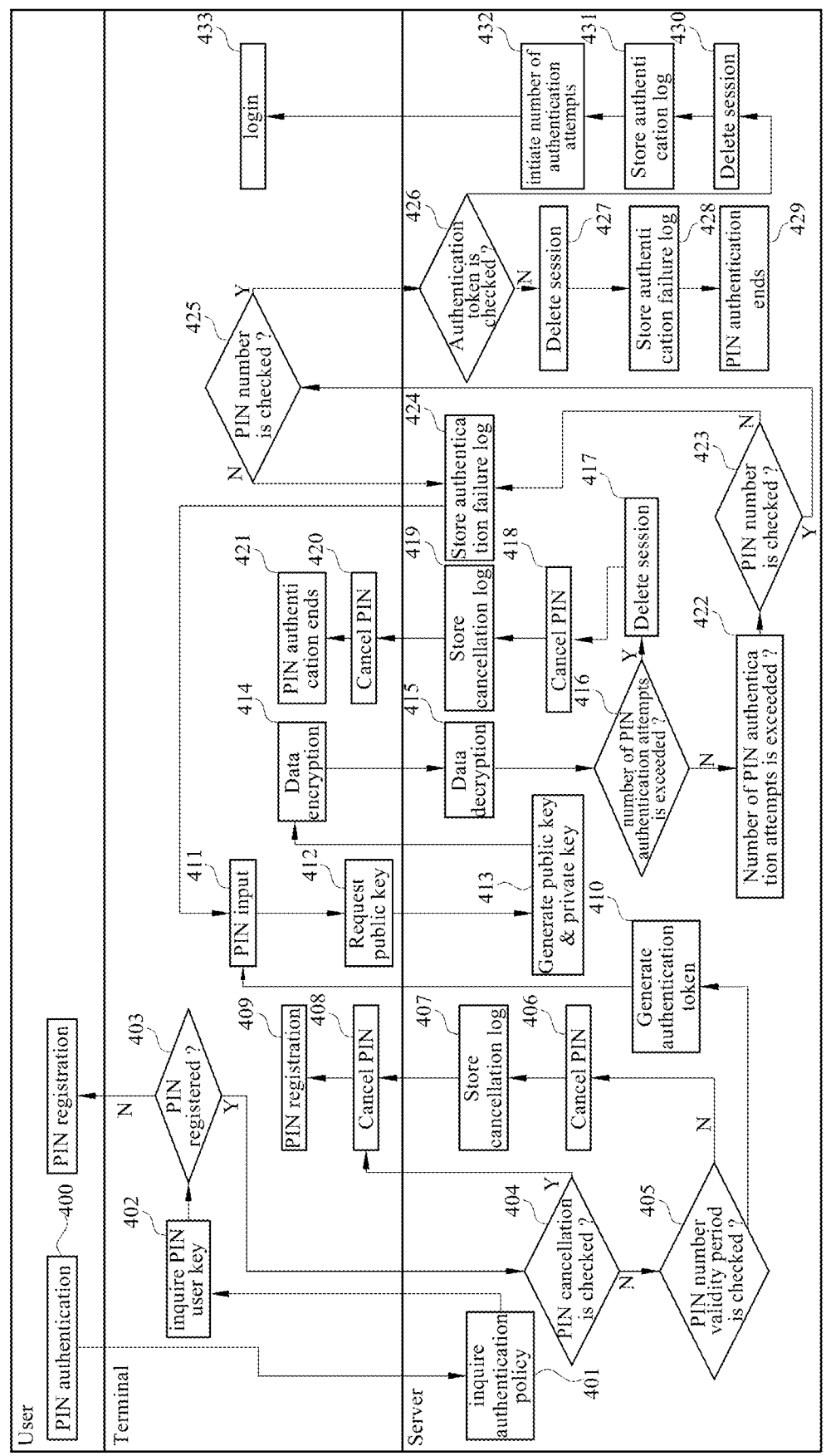
FIG. 4 is a flowchart illustrating an example of performing simple authentication using browser web storage according to an embodiment of the present disclosure.

FIG. 4 is a flowchart illustrating an example of performing simple authentication using browser web storage according to an embodiment of the present disclosure.

Referring to FIG. 4, a PIN authentication procedure is started in operation 400. Through operations 401 to 409, it is determined whether PIN number registration is necessary. First, in operation 401, the server 100 inquires the authentication policy and transmits the same to the terminal 200, and the terminal 200 inquires the user key and determines whether to register the PIN in operation 403. When the PIN number is registered in the web storage, the server 100 checks whether the PIN registration has been canceled 404 or the validity period has expired 405, and accordingly, cancels the PIN number 406 and stores a cancellation log 407. Thereafter, the PIN is finally canceled 408 in the terminal 200, and the PIN registration procedure may be performed again in operation 409.

In operation 410, when PIN registration is identified, the server 100 generates an authentication token for simple authentication, stores the same in the session, and transmits the same to the terminal 200. Here, the authentication token may be data in the form of a combination of hostname, IP, and timestamp.

When the authentication token is received, the terminal 200 receives a PIN number from a user in operation 411 and requests a public key in operation 412.

In operation 413, the server 100 generates a public key and a private key based on a user key, generates the public key and the private key and stores the same in the session, and transmits the public key and the session key corresponding to the session to the terminal 200.

In operation 414, the terminal 200 uses the received public key to encrypt the PIN number data entered by a user, and transmits the encrypted data along with the received session key to a server.

In operation 415, the server 100 decrypts the PIN number data using the private key corresponding to the received session key, and in operation 416, it is checked whether the number of PIN authentication attempts has been exceeded. When the number of PIN authentication attempts has been exceeded, operations 417 to 421 are performed to end PIN authentication.

In operation 422, the number of PIN authentication attempts is increased, and in operation 423, primary authentication is performed to check whether the PIN number matches the PIN number stored in the server 100. The same operation may be performed in the terminal 200 and/or the server 100 in operation 425. When the PIN number does not match, the authentication failure log is stored in operation 424 and the PIN number input of operation 411 is repeated again. When the primary authentication is passed, the terminal 200 encrypts the authentication token using the public key received from the server, and transmits the encrypted data along with the previously received session key to the server.

In operation 426, the server 100 checks the authentication token. For example, secondary authentication is performed to check whether the authentication token is reused or the authentication validity time has elapsed.

When the server fails to pass the check, the session is deleted (operation 427), the authentication failure log is stored (operation 428), and the PIN authentication is terminated (operation 429). When the server 100 passes the authentication token check, the session is deleted (operation 430), but the authentication token is separately stored (operation 431), and the number of authentication attempts is initiated (operation 432). In operation 433, the login of the terminal 200 through the PIN number simple authentication is finally completed.

Figure 5:
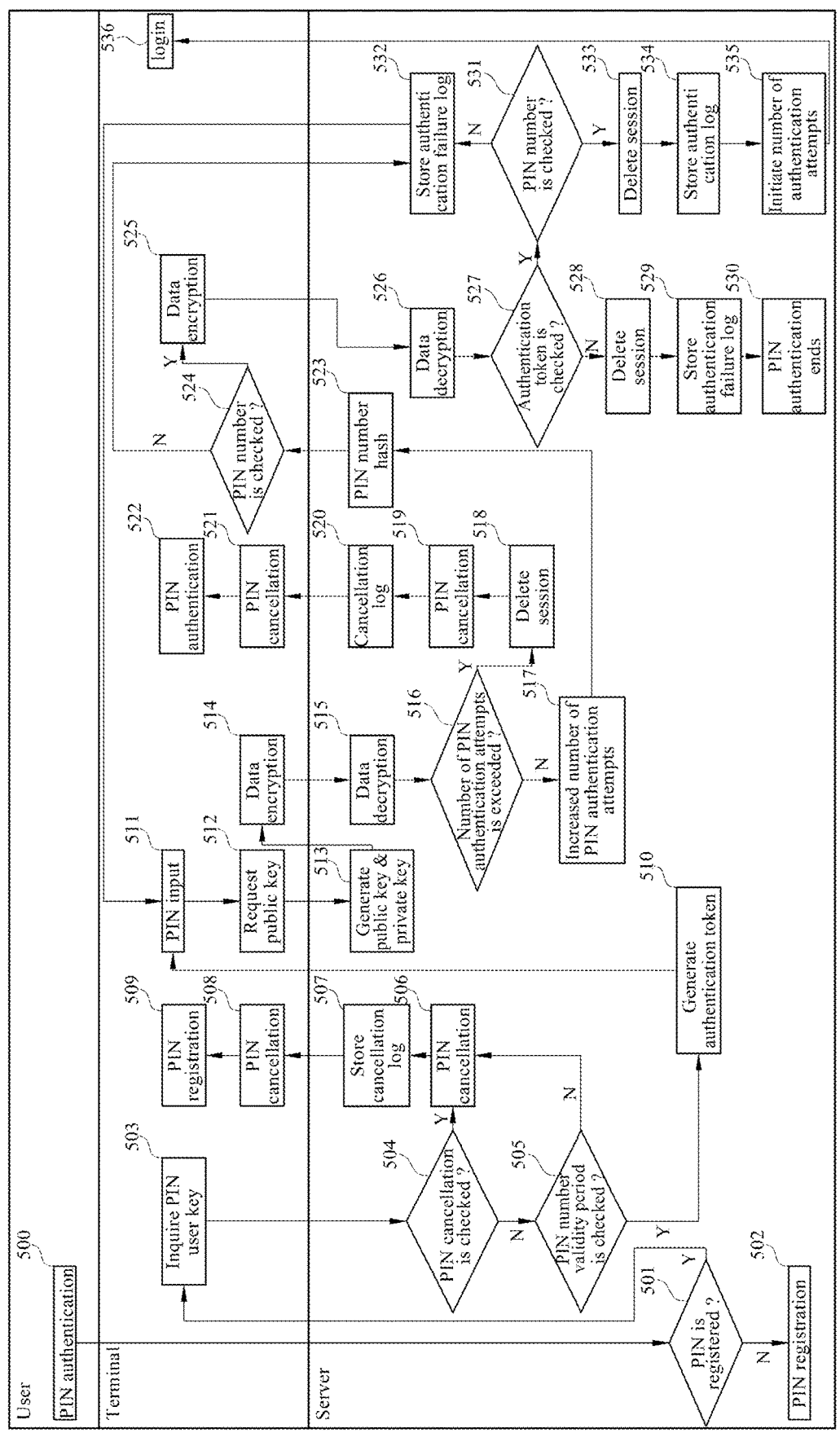
FIG. 5 is a flowchart illustrating another example of performing simple authentication using browser web storage according to an embodiment of the present disclosure.

FIG. 5 is a flowchart illustrating another example of performing simple authentication using browser web storage according to an embodiment of the present disclosure.

When PIN authentication is started in operation 500, it is determined in operation 501 whether the PIN is registered. When the PIN is not registered, the process proceeds to operation 502 and the registration described above in FIG. 3 is performed.

In operation 503, when it is identified that the PIN has been registered, the user key stored in the web storage or cookie is inquired and transmitted to the server. The server 100 checks whether the PIN registration is canceled in operation 504 and checks the PIN number validity period in operation 505.

When the PIN registration has been canceled, a PIN registration procedure is performed through operations 506 to 509.

In operation 510, when PIN registration is identified, the server 100 generates an authentication token for simple authentication, stores the same in the session, and transmits the same to the terminal 200. Here, the authentication token may be data in the form of a combination of hostname, IP, and timestamp.

When the authentication token is received, the terminal 200 receives a PIN number from a user in operation 511 and requests a public key in operation 512.

In operation 513, the server 100 generates a public key and a private key based on a user key, generates the public key and the private key and stores the same in the session, and transmits the public key and the session key corresponding to the session to the terminal 200.

In operation 514, the terminal 200 uses the received public key to encrypt the PIN number data entered by the user, and transmits the encrypted data along with the received session key to the server.

In operation 515, the server 100 decrypts the PIN number data using the private key corresponding to the received session key, and in operation 516, it is checked whether the number of PIN authentication attempts has been exceeded. When the number of PIN authentication attempts has been exceeded, operations 518 to 522 are performed to end PIN authentication.

In operation 523, the server 100 hash-encrypts the decrypted PIN number and transmits the same to the terminal 200. In operation 524, the terminal 200 checks whether the received PIN number matches the stored PIN number. When the PIN number do not match, the authentication failure log is stored in operation 532 and the PIN number input of operation 511 is repeated again. When the primary authentication is passed, the terminal 200 encrypts the user key, PIN number, and authentication token received from the server using the public key, and transmits the encrypted data along with the previously received session key to the server.

In operation 526, the server 100 decrypts the authentication token, the user key, and the PIN number using the private key corresponding to the session key, and in operation 527, the server 100 checks the authentication token. For example, secondary authentication is performed to check whether the authentication token is reused or the authentication validity time has elapsed.

When the server fails to pass the check, the session is deleted (operation 528), the authentication failure log is stored (operation 529), and the PIN authentication is terminated (operation 530). When the server 100 passes the authentication token check, the server performs a PIN number check (operation 531). When the server fails to pass the check, the authentication failure log is stored (operation 532). When the server passes the check, the session is deleted (operation 533). The server 100 separately stores the authentication token (operation 534) and initializes the number of authentication attempts (operation 535). In operation 536, the login of the terminal 200 through the PIN number simple authentication is finally completed.

Figure 6:
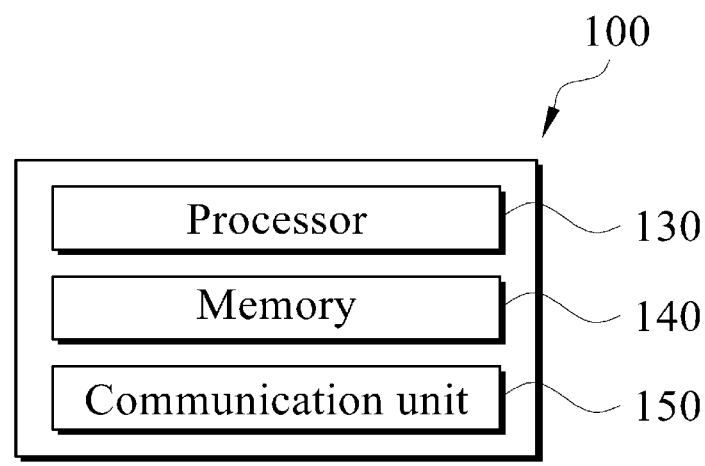
FIG. 6 is a block diagram schematically illustrating an internal configuration of a server performing a simple authentication process using browser web storage according to an embodiment of the present disclosure.
Figure 7:
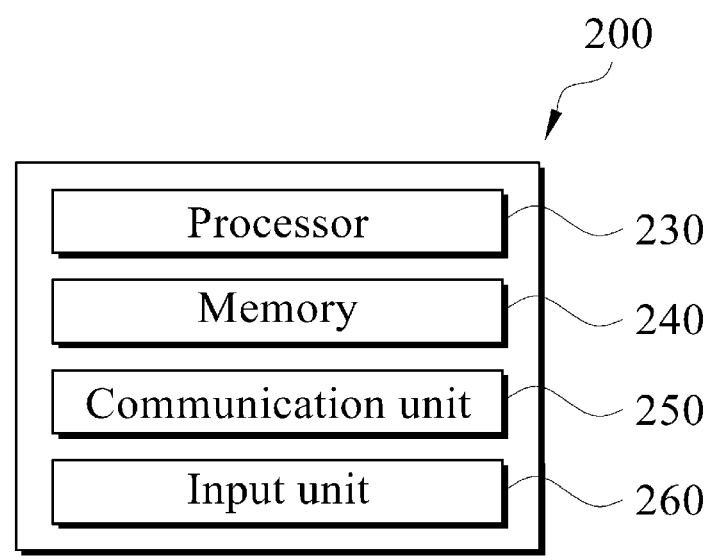
FIG. 7 is a block diagram schematically illustrating an internal configuration of a terminal performing a simple authentication process using browser web storage according to an embodiment of the present disclosure.

FIG. 6 is a block diagram schematically illustrating an internal configuration of a server 100 performing a simple authentication process using browser web storage according to an embodiment of the present disclosure. FIG. 7 is a block diagram schematically illustrating an internal configuration of a terminal 200 performing a simple authentication process using browser web storage according to an embodiment of the present disclosure.

FIGS. 6 and 7 illustrate only the configurations necessary to explain an embodiment of the present disclosure, but various configurations such as a display device may be further included. In addition, although omitted from the descriptions of FIGS. 6 and 7, it is apparent to those skilled in the field to which the present disclosure pertains that the configuration necessary for performing the method described above in FIGS. 1 to 5 may be further included.

Referring to FIG. 6, the server 100 according to an embodiment of the present disclosure may include a processor 130, a memory 140, and a communication unit 150. The operation of the server 100 for performing simple authentication may be performed by executing a program stored in the memory 140 through the processor 130.

The calculation performed by the processor 130 according to an embodiment of the present disclosure may generate an authentication token, a public key, and a private key based on the received user key and stores the same in a session, and transmits a session key corresponding to the session, the authentication token and the public key to the terminal. When the encrypted data and session key are received from the terminal, the PIN number data is decrypted using the private key corresponding to the received session key to perform simple authentication.

In addition, the processor 130 may restore the encrypted PIN number data based on the private key retrieved through the received session key to perform the primary authentication.

In addition, the processor 130 may perform an operation of deleting the session after performing secondary authentication by comparing the authentication token restored based on the private key with the authentication token stored in the session.

In addition, the processor 130 updates the number of authentication attempts whenever the restored PIN number does not match, and when the number of authentication attempts increases by more than a predetermined number, PIN number data stored in the server and/or terminal may be deleted.

In an embodiment of the present disclosure, the communication unit 150 may perform wireless or wired communication between the terminal 200 or another server or other external device. For example, the communication unit 150 may perform encrypted communication with the terminal 200 in an SSL manner, and may transmit a public key and encrypted data.

Referring to FIG. 7, the terminal 200 according to an embodiment of the present disclosure may include a processor 230, a memory 240, a communication unit 250, and an input unit 260. The operation of the simple authentication terminal 200 may be performed by executing a program stored in the memory 240 through the processor 230.

The operation performed by the processor 230 according to an embodiment of the present disclosure may include an operation of requesting the issuance of the public key based on the user key, using the public key received from the server, encrypting the PIN number data entered by the user, and transmitting the encrypted data along with the received session key to the server. The user key and PIN number may be stored in terminal web storage and set differently for each device or browser.

As another example, the processor 230 may encrypt the authentication token using the public key, and transmit the encrypted data to the server along with the session key received from the server 100.

As another example, authentication data (a user key and a PIN number) encrypted based on the public key may be stored in a blockchain. Accordingly, the processor 230 may perform authentication and verification of the PIN number entered by the user based on the blockchain, thereby reducing the possibility of falsification and increasing reliability.

As another example, the processor 230 may encrypt the PIN number data entered by the user using the public key stored in a blockchain.

The above-described server 100 and terminal 200 may include one or more processors 130, 230 and/or one or more memories 140, 240. In addition, the memories 140, 240 may include volatile and/or non-volatile memories. The one or more memories 140, 240 may store instructions that, when executed by the one or more processors 130, 230, cause the one or more processors 130, 230 to perform a calculation. In the present disclosure, programs or commands are software stored in the memories 140, 240, and may include middleware that provides various functions to applications so that the operating system, applications and/or applications for controlling the resources of the server 100 may utilize the resources of a device.

The one or more processors 130, 230 may drive software (for example, commands, programs) so as to control at least one component of the server 100 and the terminal 200 connected to the processors 130, 230. The processors 130, 230 may also perform various calculations, processes, data generation, processing, and the like, which are related to the present disclosure. The processors 130, 230 may also load data or the like from the memories 140, 240 or store the data in the memories 140, 240.

In an embodiment of the present disclosure, at least one of the components of the server 100 and the terminal 200 may be omitted, or another component may be added. Additionally or alternatively, some of the components may be integrated or implemented as a single entity or multiple entities.

The above-described communication units 150, 250 may perform wireless communication depending on a system, such as enhanced Mobile Broadband (eMBB), Ultra Reliable Low-Latency Communication (URLLC), Massive Machine-Type Communication (MMTC), Long-Term Evolution (LTE), LTE-A (LTE Advanced), Universal Mobile Telecommunications System (UMTS), Global System for Mobile communication (GSM), Code Division Multiple Access (CDMA), Wideband CDMA (WCDMA), Wireless Broadband (WiBro), Wi-Fi communication, Bluetooth, Near Field Communication (NFC), Global Positioning System (GPS), or Global Navigation Satellite System (GNSS).

The above-described input unit 260 may include a method for inputting the simple authentication information (a PIN number) of a user, such as a keyboard, mouse, touchpad, and camera module, to the terminal 200.

The operations of a method or algorithm described in connection with the embodiments of the present disclosure may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form well known in the technical field to which the present disclosure pertains.

In addition, an aspect of the present disclosure may provide a simple authentication method that generates a one-time key based on a public key for simple authentication in a mobile web or PC web and gives up immediately after use, in particular, using browser web storage to issue a private key for each device and browser.

In addition, an aspect of the present disclosure can enhance personal information and security through a method of distributing and storing public key and private key elements in the terminal and server.

In addition, an aspect of the present disclosure may provide stronger security in a simple authentication method by supporting one-time key generation using distributed and stored public key and private key elements. In other words, without storing a key value, it can be generated and discarded whenever necessary, thereby preventing the key value from being leaked. In addition, implementation and management costs can be streamlined because web storage may be used to issue and store private keys for each device and browser in one platform.

Furthermore, since it is possible to use public and private keys with enhanced security by using elements stored in the browser storage and server, it is possible to provide a reliable and simple authentication method that can replace authentication certificates.

Hereinafter, with reference to FIGS. 8 to 14, a simple authentication process through distributed storage of public and private key elements according to an embodiment of the present disclosure will be described in detail.

Figure 8:
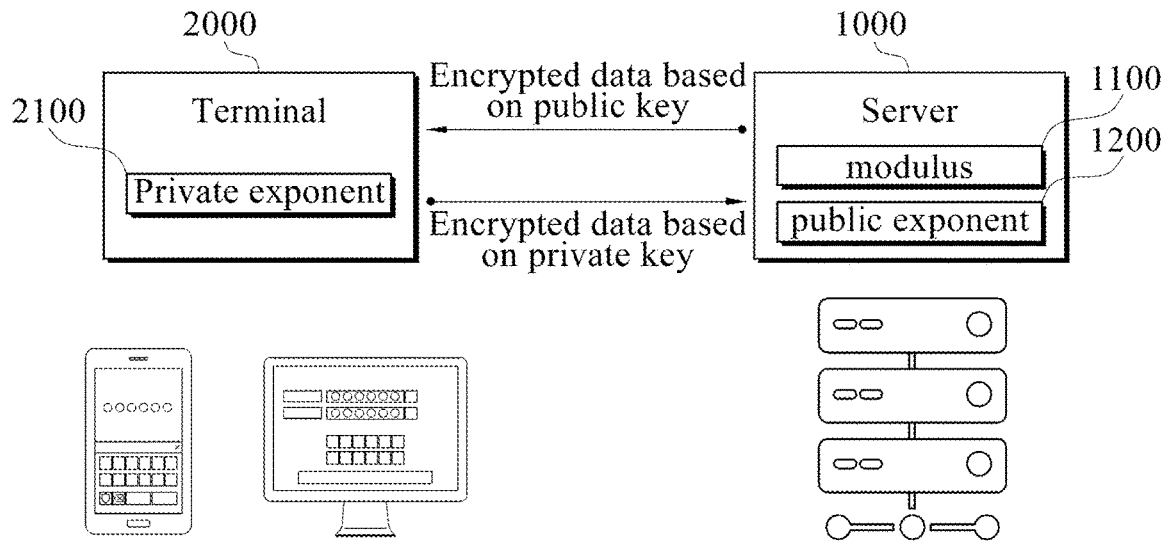
FIG. 8 is a conceptual diagram for explaining a simple authentication system through distributed storage of components of a public key and a private key according to an embodiment of the present disclosure.

FIG. 8 is a conceptual diagram for explaining a simple authentication system through distributed storage of components of a public key and a private key according to an embodiment of the present disclosure.

Referring to FIG. 8, the simple authentication system according to an embodiment of the present disclosure may include a server 1000 and a terminal 2000. Specifically, in the simple authentication system, when the terminal 2000 encrypts, based on a private key, data required for user authentication to use the Internet to access government institutions, educational institutions, medical institutions, telecommunication companies, financial companies, passenger transport companies, asset management, credit information, portal sites, social network services (SNS), and numerous online services such as games, shopping, ticketing, courier services, and electronic voting, and sends the data to the server 1000, the server 1000 may authenticate the user by decrypting the data based on the public key. Conversely, the server 1000 may send the public key-based encrypted data to the terminal, and the terminal 2000 may decrypt the same based on the private key. The data encrypted through the private key for the simple authentication may include a PIN user key and a PIN number.

However, the public key and the private key required for such a user authentication method are often stored using a plaintext storage method in a browser storage (local storage), which is easy to cause a security drawback. Although the encryption method is taken as a security measure, these methods still have may drawbacks of personal information leakage or security.

Accordingly, the simple authentication system according to an embodiment of the present disclosure extracts a modulus 1100, a private exponent 2100 and a public exponent 1200 in the public key and the private key generated by the server 1000. After extraction, the private exponent 2100 is stored in the terminal 2000, and the modulus 1100 and the public exponent 1200 are stored in the server 1000 to enhance security.

In other words, the simple authentication system may generate a private key using the private exponent 2100 stored in the terminal 2000 and the modulus 1100 stored in the server 1000 during simple authentication, or may generate a public key using the modulus 1100 and the public exponent 1200 stored in the server 1000.

The simple authentication system according to an embodiment of the present disclosure distributes and stores the modulus 1100 and public exponent 1200 for generating these private and public keys using a blockchain, so that the simple authentication system may be implemented without the central server 1000.

Accordingly, the simple authentication system may provide stronger security in a simple authentication method by supporting one-time key generation using distributed and stored public key and private key elements. In other words, without storing a key value, it can be generated and discarded whenever necessary, thereby preventing the key value from being leaked. In addition, when the private key element is stored using browser web storage, it is possible to issue and store the private key for each device and browser used in one platform, so that the implementation and management costs can be streamlined.

Furthermore, since it is possible to use public and private keys with enhanced security by using elements stored in the browser storage and server, it is possible to provide a reliable and simple authentication method that can replace authentication certificates.

Hereinafter, with reference to FIGS. 9 to 14, a simple authentication method and device through distributed storage of components of a public key and a private key will be described in more detail.

Figure 9:
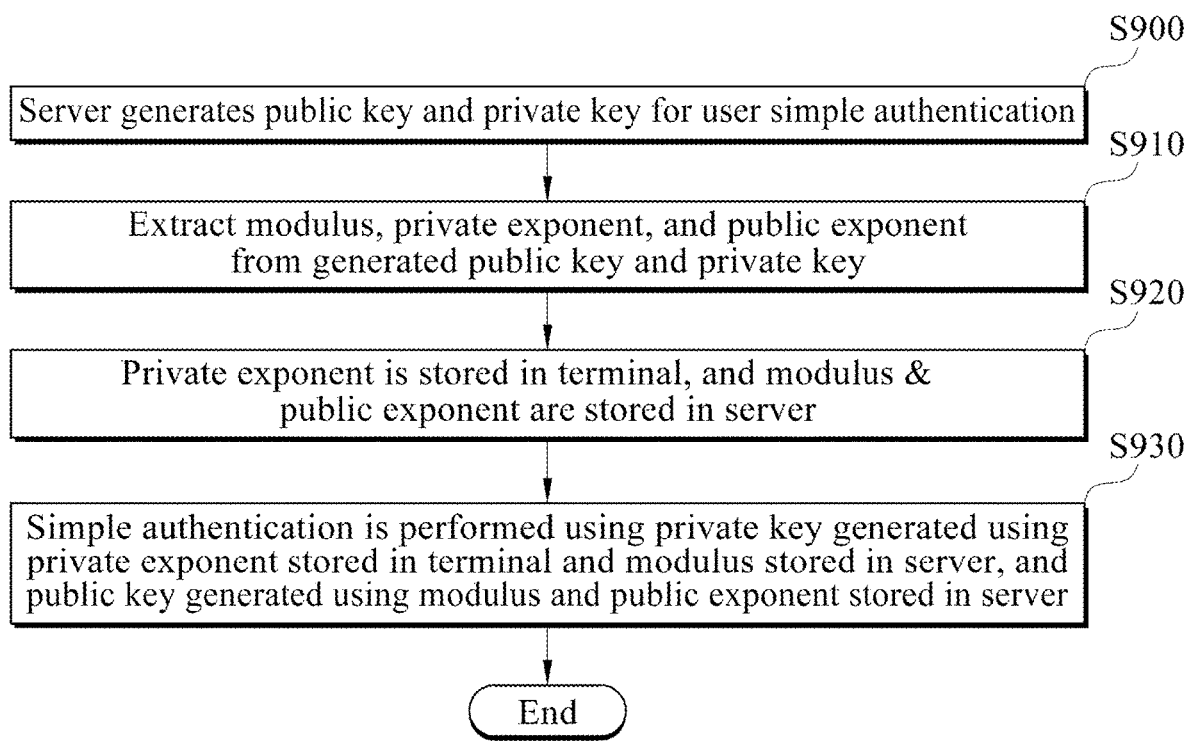
FIG. 9 is a flowchart illustrating a simple authentication method through distributed storage of components of a public key and a private key according to an embodiment of the present disclosure.

FIG. 9 is a flowchart illustrating a simple authentication method through distributed storage of components of a public key and a private key according to an embodiment of the present disclosure.

Referring to FIG. 9, in operation S900, the simple authentication system according to an embodiment of the present disclosure generates a public key and a private key in the server 1000 for use simple authentication. Here, the public key may be generated in an RSA method in connection with user identification data.

Next, in operation S910, the simple authentication system extracts a modulus, a private exponent, and a public exponent from the generated public key and private key. Here, the public exponent may be converted into hexadecimal and compiled, and thus, compiled data may be used when generating the public key later.

In operation S920, the simple authentication system allows the private exponent to be stored in the terminal 2000, and the modulus and public exponent to be stored in the server 1000.

In operation S930, the simple authentication system performs simple authentication using the private key generated using the private exponent stored in the terminal 2000 and the modulus stored in the server 1000, and the public key generated using the modulus and the public exponent stored in the server 1000.

The private key generated using the private exponent stored in the terminal 2000 and the modulus stored in the server 1000 and the public key generated using the modulus and the public exponent stored in the server may be used once for encryption or decryption, respectively, and then be discarded.

Hereinafter, with reference to FIGS. 10 to 12, the operation of the server 1000 and the terminal 2000 in the simple authentication system described above will be described in more detail.

Figure 10:
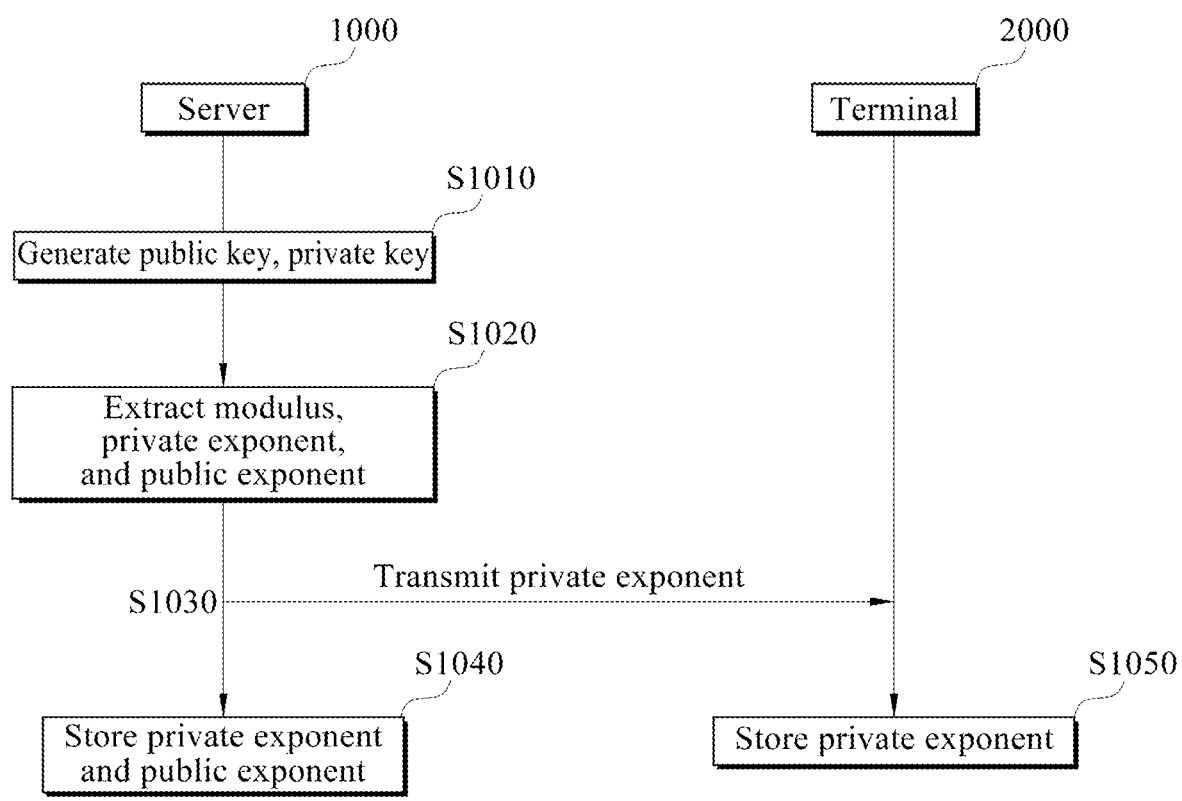
FIG. 10 is a diagram for explaining an example of a method for performing distributed storage of components of a public key and a private key according to an embodiment of the present disclosure.

FIG. 10 is a diagram for explaining an example of a method for performing distributed storage of components of a public key and a private key according to an embodiment of the present disclosure.

Referring to FIG. 10, in operation S1010, the server 1000 generates a public key and a private key. Here, the generated public key may be generated in an RSA method in connection with user identification data.

Next, in operation S1020, the server 1000 extracts a modulus, a private exponent, and a public exponent from the generated public key and private key. Here, the public exponent may be converted into hexadecimal and compiled, and thus, compiled data may be used when generating the public key later.

In operation S1030, the server 1000 transmits the extracted private exponent to the terminal 2000, proceeds to operation S1040, and stores the modulus and the public exponent in the server 1000. Here, the public exponent may be converted into hexadecimal and compiled.

In operation S1050, the terminal 2000 stores the received private exponent in the browser storage.

Figure 11:
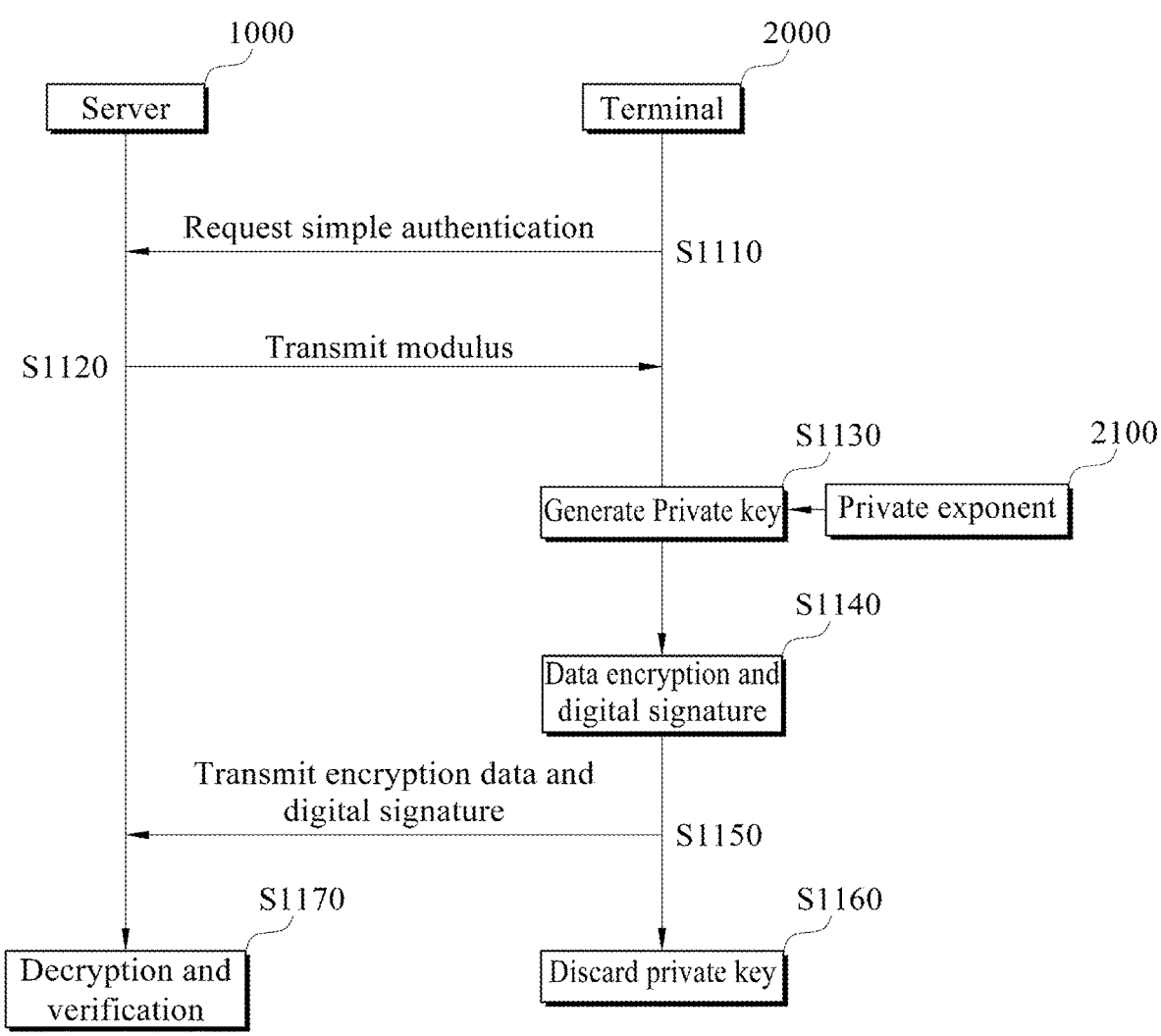
FIG. 11 is a flowchart illustrating an example of generating a private key in a terminal according to an embodiment of the present disclosure.

FIG. 11 is a flowchart illustrating an example of generating a private key in a terminal according to an embodiment of the present disclosure.

Referring to FIG. 11, in operation 110, upon receipt of a request to perform simple authentication from the terminal 2000, the server 1000 transmits the modulus stored in operation S1040 of FIG. 10 to the terminal 2000 S1120.

In operation S1130, the terminal 2000 generates a private key using the received modulus and the stored private exponent 2100.

In operation S1140, the terminal 2000 performs data encryption and digital signature using the generated private key. In addition, upon proceeding to operation S1150, the terminal transmits the encrypted data and the digital signature to the server 1000. The private key is immediately discarded after being used once S1160.

In operation S1170, the encrypted data and digital signature transmitted to the server 1000 in this way are decrypted using the public key, and the decrypted data is verified using the transmitted digital signature.

Figure 12:
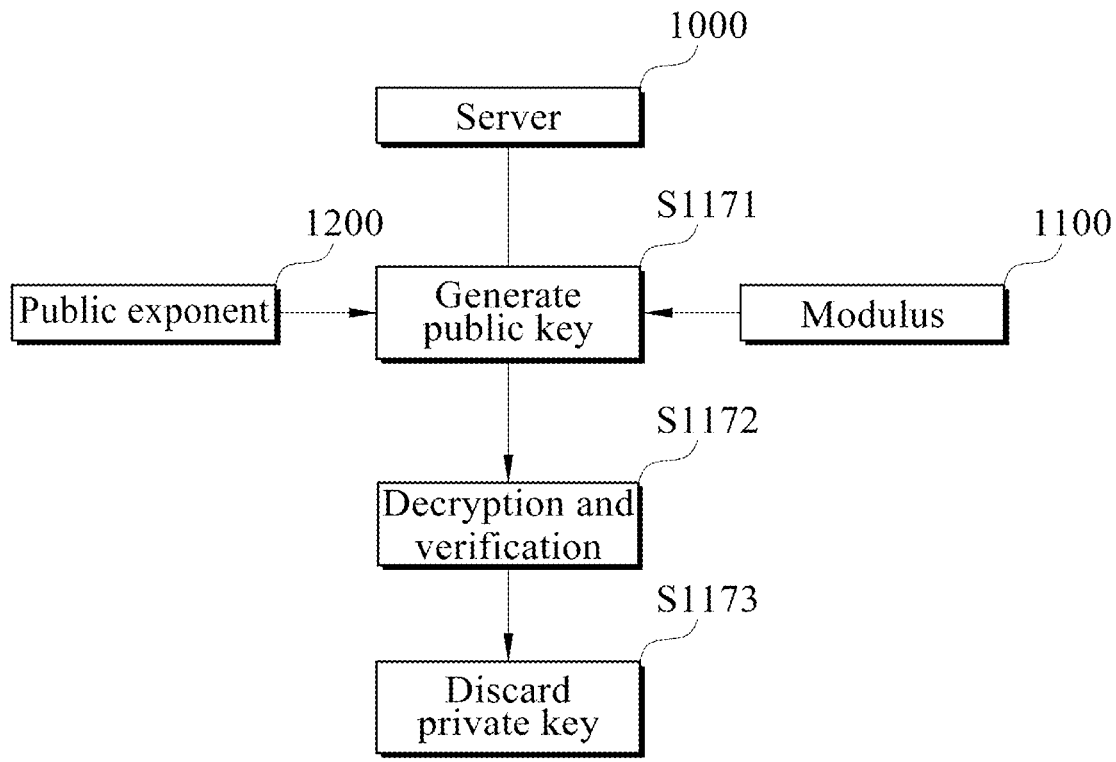
FIG. 12 is a flowchart illustrating an example of generating a public key in a server according to an embodiment of the present disclosure.

FIG. 12 is a flowchart illustrating an example of generating a public key in a server according to an embodiment of the present disclosure.

Referring to FIG. 12, in operation S1171, the server 1000 generates a public key using the stored modulus 1100 and the compiled public exponent 1200.

In operation S1172, the server 1000 performs decryption and verification using the generated public key, and the public key used once is discarded S1173.

Accordingly, it is possible to provide stronger security in a simple authentication method by supporting one-time key generation using distributed and stored public key and private key elements according to an embodiment of the present disclosure.

Figure 13:
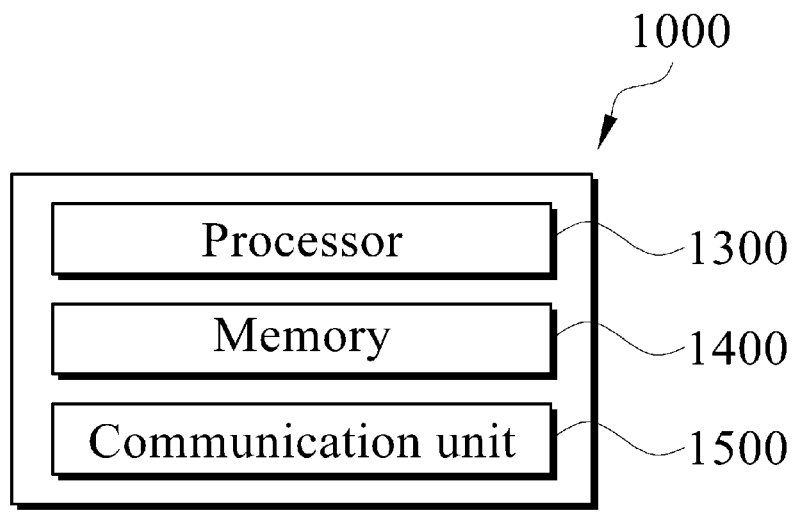
FIG. 13 is a block diagram schematically illustrating an internal configuration of a server performing a simple authentication process through distributed storage of components of a public key and a private key according to an embodiment of the present disclosure.
Figure 14:
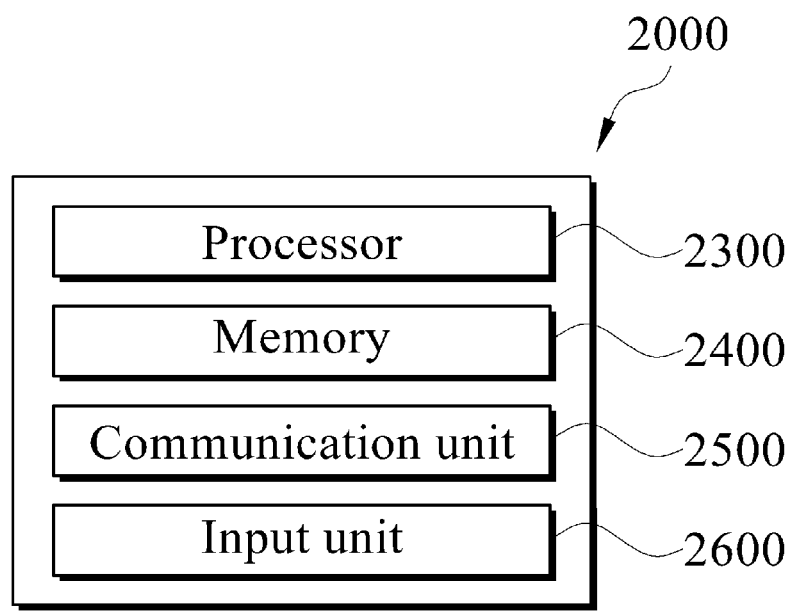
FIG. 14 is a block diagram schematically illustrating an internal configuration of a terminal performing a simple authentication process through distributed storage of components of a public key and a private key according to an embodiment of the present disclosure.

FIG. 13 is a block diagram schematically illustrating an internal configuration of a server 1000 performing a simple authentication process through distributed storage of components of a public key and a private key according to an embodiment of the present disclosure. FIG. 14 is a block diagram schematically illustrating an internal configuration of a terminal 2000 performing a simple authentication process through distributed storage of components of a public key and a private key according to an embodiment of the present disclosure.

FIGS. 13 and 14 illustrate only the configurations necessary to explain an embodiment of the present disclosure, but various configurations such as a display device may be further included. In addition, although omitted from the descriptions of FIGS. 13 and 14, it is apparent to those skilled in the field to which the present disclosure pertains that the configuration necessary for performing the method described above in FIGS. 8 to 12 may be further included.

Referring to FIG. 13, the server 1000 according to an embodiment of the present disclosure may include a processor 1300, a memory 1400, and a communication unit 1500. The operation of the server 1000 for performing simple authentication may be performed by executing a program stored in the memory 1400 through the processor 1300.

The calculation performed in the processor 1300 according to an embodiment of the present disclosure may be performed to extract a modulus, the private exponent, and the public exponent from the public key and the private key generated for user simple authentication, transmit the private exponent to the terminal, store the modulus and the public exponent, and generate a public key generated using the public exponent and the modulus. Here, one or more memories 1400 may store a modulus and a public exponent.

The processor 1300 according to an embodiment of the present disclosure may generate a public key using the stored modulus and public exponent, decrypt the encrypted data received from the terminal with the generated public key, and then performs a calculation to discard the public key again.

Here, the public exponent is to be converted into hexadecimal and compiled, and the public key may be generated in an RSA method in connection with user identification data.

In addition, the communication unit 150 may perform wireless or wired communication between the terminal 2000 or another server or other external device. For example, the communication unit 150 may transmit the private exponent or modulus to the terminal 2000.

Referring to FIG. 14, the terminal 2000 according to an embodiment of the present disclosure may include a processor 2300, a memory 2400, a communication unit 2500, and an input unit 2600. The operation of the simple authentication terminal 2000 may be performed by executing a program stored in the memory 2400 through the processor 2300.

The calculation performed in the processor 2300 according to an embodiment of the present disclosure may include a calculation to store a private exponent, receive a modulus stored in the server during user simple authentication, and generate a private key.

For example, the processor 2300 receives a modulus from the server 1000 to encrypt the simple authentication information of a user (for example, a PIN number) entered through the input unit 2600, and combines the same with the private exponent to generate a private key.

In addition, the processor 2300 may transmit data and digital signature information encrypted using the private key to the server 1000 to perform simple authentication.

The above-described server 1000 and terminal 2000 may include one or more processors 1300, 2300 and/or one or more memories 1400, 2400. In addition, the memories 1400, 2400 may include volatile and/or non-volatile memories. The one or more memories 1400, 2400 may store instructions that, when executed by the one or more processors 1300, 2300, cause the one or more processors 1300, 2300 to perform a calculation. In the present disclosure, programs or commands are software stored in the memories 1400, 2400, and may include middleware that provides various functions to applications so that the operating system, applications and/or applications for controlling the resources of the server 1000 may utilize the resources of a device.

The one or more processors 1300, 2300 may drive software (for example, commands, programs) so as to control at least one component of the server 1000 and the terminal 2000 connected to the processors 1300, 2300. The processors 1300, 2300 may also perform various calculations, processes, data generation, processing, and the like, which are related to the present disclosure. The processors 1300, 2300 may also load data or the like from the memories 1400, 2400 or store the data in the memories 1400, 2400.

In an embodiment of the present disclosure, at least one of the components of the server 1000 and the terminal 2000 may be omitted, or another component may be added. Additionally or alternatively, some of the components may be integrated or implemented as a single entity or multiple entities.

The above-described communication units 1500, 2500 may perform wireless communication depending on a system, such as enhanced Mobile Broadband (eMBB), Ultra Reliable Low-Latency Communication (URLLC), Massive Machine-Type Communication (MMTC), Long-Term Evolution (LTE), LTE-A (LTE Advanced), Universal Mobile Telecommunications System (UMTS), Global System for Mobile communication (GSM), Code Division Multiple Access (CDMA), Wideband CDMA (WCDMA), Wireless Broadband (WiBro), Wi-Fi communication, Bluetooth, Near Field Communication (NFC), Global Positioning System (GPS), or Global Navigation Satellite System (GNSS).

The above-described input unit 2600 may include a method for inputting the simple authentication information of a user, such as a keyboard, mouse, touchpad, and camera module, to the terminal 200.

The operations of a method or algorithm described in connection with the embodiments of the present disclosure may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form well known in the technical field to which the present disclosure pertains.

Although the embodiments of the present disclosure have been described with reference to the attached drawings, those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

The invention claimed is:

1. A simple authentication method using browser web storage, the method comprising the operations in which:
   a server generates a one-time session and a session key corresponding to the one-time session according to an authentication request, generates an authentication token, a public key and a private key based on a user key received from a terminal and stores the same in the one-time session, and transmits the session key, the authentication token and the public key to the terminal;
   using the received public key, the terminal encrypts PIN number data entered by a user, and transmits the encrypted data along with the received session key to the server;
   using the private key stored in the one-time session corresponding to the received session key, the server decrypts the received encrypted PIN number data, and identifies whether the decrypted PIN number data matches the PIN number data previously stored in the browser web storage to perform primary authentication;
   when the primary authentication result matches, the terminal encrypts the received authentication token using the received public key and transmits same along with the received session key to the server;
   using the private key stored in the one-time session corresponding to the received session key, the server identifies whether the received encrypted authentication token matches the authentication token stored in the one-time session to perform secondary authentication; and
   when the second authentication is completed, the server deletes the one-time session and the session key,
   wherein the user key and the PIN number data are stored in the browser web storage and set differently for each device or browser, and
   wherein the authentication token, the public key, the private key, the one-time session, and the session key are one-time generated whenever an authentication is requested;

extracting, by the server, a modulus, a private exponent and a public exponent from the generated public key and private key;

storing the private exponent in the terminal and storing the modulus and the public exponent in a blockchain; and performing simple authentication by the terminal using the private key generated by receiving the private exponent stored in the terminal and the modulus stored in the blockchain and the server using the public key generated by receiving the modulus and the public exponent stored in the blockchain at the time of simple authentication, wherein the private key and public key generated during the performance of the simple authentication are one-time keys generated when a simple authentication request is received, and are discarded after being used once for encryption or decryption, respectively.

2. The method of claim 1, wherein the user key is encrypted with an encryption algorithm, and the PIN number is hash-encrypted and stored in the browser web storage.

3. The method of claim 1, wherein the transmission of the public key to the terminal comprises:
determining, by the terminal, whether the user key is stored in the browser web storage; and
when the user key is not stored, registering a PIN number from a user.

4. The method of claim 1, wherein:
when the primary authentication result does not match, the server updates a number of authentication attempts, and
when the number of authentication attempts is greater than or equal to a predetermined value, the server deletes the PIN number data previously stored in the server.

5. A simple authentication system using a browser web storage, the system comprising:
a server that:
generates a one-time session and a session key corresponding to the one-time session according to an authentication request,
generates an authentication token, a public key and a private key based on a user key received from a terminal and stores same in the one-time session,
transmits the session key, the authentication token and the public key to the terminal,
decrypts the encrypted PIN number data using the private key stored in the one-time session corresponding to the received session key upon receipt of the encrypted PIN number data and the session key from the terminal,
identifies whether the decrypted PIN number data matches the PIN number data previously stored in the browser web storage to perform primary authentication,
identifies whether the received encrypted authentication token matches the authentication token stored in the one-time session to perform secondary authentication using the private key stored in the one-time session corresponding to the received session key upon receipt of the encrypted authentication token and the session key from the terminal, and
deletes the one-time session and the session key when the secondary authentication is completed; and
a terminal that:
requests the server to issue a public key on the basis of the user key,
encrypts PIN number data entered by the user using the public key received from the server, and transmits the encrypted data along with the received session key to the server, and
when the primary authentication result matches, encrypts the received authentication token using the received public key and transmits same along with the received session key to the server,
wherein the user key and the PIN number data are stored in the browser web storage and set differently for each device or browser, and
wherein the authentication token, the public key, the private key, the one-time session, and the session key are one-time generated whenever an authentication is requested,
wherein the server:
extracts a modulus, a private exponent and a public exponent from the generated public key and private key;
stores the private exponent in the terminal and storing the modulus and the public exponent in a blockchain; and
performs simple authentication by the terminal using the private key generated by receiving the private exponent stored in the terminal and the modulus stored in the blockchain and the server using the public key generated by receiving the modulus and the public exponent stored in the blockchain at the time of simple authentication, and
wherein the private key and public key generated during the performance of the simple authentication are one-time keys generated when a simple authentication request is received, and are discarded after being used once for encryption or decryption, respectively.

6. The system of claim 5, wherein:
when the primary authentication result does not match, the server updates a number of authentication attempts, and
when the number of authentication attempts is greater than or equal to a predetermined value, the server deletes the PIN number data previously stored in the server.

7. A non-transitory computer-readable recording medium storing a simple authentication program, and configured to be coupled with a computer being a hardware, the program including instructions to execute the method of claim 1.

8. The method of claim 1, wherein the browser web storage comprises a web storage of a blockchain-based browser, and the public key is stored in the blockchain and used to verify whether the public key has been falsified or forged.

9. The method of claim 1, wherein the performance of the simple authentication further comprises:
transmitting the modulus to the terminal in response to a simple authentication request in the blockchain;
generating, by the terminal, the private key using the modulus and the stored private exponent;
encrypting, by the terminal, data and performing digital signature using the generated private key;
transmitting, by the terminal, the encrypted data and digital signature to the server; and
discarding, by the terminal, the private key.

10. The method of claim 9, wherein the performance of the simple authentication further comprises:
transmitting the modulus and the public exponent to the server in response to a simple authentication request in the blockchain;

generating, by the server, the public key using the modulus and the public exponent;

decrypting, by the server, the encrypted data received from the terminal using the generated public key, and performing verification using the digital signature; and discarding, by the server, the public key.

11. The method of claim 1, wherein the public exponent is converted into hexadecimal and compiled.

12. The method of claim 1, wherein the public key is generated in an RSA method in connection with user identification data.

* * * * *